US011873977B2

(12) United States Patent
Cornell et al.

(10) Patent No.: US 11,873,977 B2
(45) Date of Patent: Jan. 16, 2024

(54) STAND LIGHT

(71) Applicant: MILWAUKEE ELECTRIC TOOL CORPORATION, Brookfield, WI (US)

(72) Inventors: Brian Cornell, West Allis, WI (US); Duane W. Wenzel, Waukesha, WI (US); David Proeber, Milwaukee, WI (US); Kevin D. White, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 228 days.

(21) Appl. No.: 17/050,882

(22) PCT Filed: Jul. 20, 2020

(86) PCT No.: PCT/US2020/042800
§ 371 (c)(1),
(2) Date: Oct. 27, 2020

(87) PCT Pub. No.: WO2021/016196
PCT Pub. Date: Jan. 28, 2021

(65) Prior Publication Data
US 2023/0110944 A1 Apr. 13, 2023

Related U.S. Application Data

(60) Provisional application No. 62/876,321, filed on Jul. 19, 2019.

(51) Int. Cl.
*F21V 21/06* (2006.01)
*F16M 11/24* (2006.01)
(Continued)

(52) U.S. Cl.
CPC ........... *F21V 21/06* (2013.01); *F16M 11/245* (2013.01); *F16M 11/28* (2013.01); *F21V 21/22* (2013.01); *F21W 2131/1005* (2013.01)

(58) Field of Classification Search
CPC ....... F21V 21/06; F21V 21/22; F16M 11/245; F16M 11/28; F21W 2131/1005
See application file for complete search history.

(56) References Cited

U.S. PATENT DOCUMENTS 4,324,477 A 4/1982 Miyazaki
4,867,416 A 9/1989 Garrett et al.
(Continued)

FOREIGN PATENT DOCUMENTS

CN 206036765 U 3/2017
DE 9308253 U1 9/1993
(Continued)

OTHER PUBLICATIONS

International Search Report and Written Opinion for Application No. PCT/US2020/042800 dated Oct. 27, 2020 (14 pages).
(Continued)

*Primary Examiner* — Anita M King
(74) *Attorney, Agent, or Firm* — Michael Best & Friedrich LLP

(57) ABSTRACT

A stand light includes an elongate body defining a longitudinal axis, a collar coupled to the elongate body for movement along the elongate body between a first position and a second position, and a plurality of legs coupled to the collar, the plurality of legs being collapsed against the elongate body when the collar is in the first position and being expanded apart from the elongate body when the collar is in the second position. The stand light also includes a head assembly coupled to an end of the elongate body. The head assembly includes a hub and a plurality of light heads. The hub is pivotably coupled to the end of the elongate body to pivot about a first pivot axis. Each of the plurality of light heads is pivotably coupled to the hub to pivot about a second pivot axis.

19 Claims, 8 Drawing Sheets

(51) Int. Cl.
*F16M 11/28* (2006.01)
*F21V 21/22* (2006.01)
*F21W 131/10* (2006.01)

(56) References Cited

U.S. PATENT DOCUMENTS

| | | | |
|---|---|---|---|
| 5,934,628 | A | 8/1999 | Bosnakovic |
| 5,964,524 | A | 10/1999 | Qian |
| 6,454,228 | B1 | 9/2002 | Bosnakovic |
| 6,873,249 | B2 | 3/2005 | Chu |
| 6,877,881 | B2 | 4/2005 | Tsao |
| 6,902,294 | B2 * | 6/2005 | Wright ............... F21V 21/06 |
| | | | 362/432 |
| 8,201,979 | B2 | 6/2012 | Deighton et al. |
| 8,651,438 | B2 | 2/2014 | Deighton et al. |
| D742,568 | S | 11/2015 | Abernethy |
| 9,222,633 | B2 | 12/2015 | Inskeep |
| D770,657 | S | 11/2016 | Fang |
| 9,810,408 | B2 | 11/2017 | Fang |
| 10,094,544 | B2 | 10/2018 | Fang |
| D848,655 | S | 5/2019 | Fang |
| D848,656 | S | 5/2019 | Fang |
| D850,689 | S | 6/2019 | Harvey et al. |
| D853,613 | S | 7/2019 | Lien |
| 10,378,739 | B2 | 8/2019 | Harvey et al. |
| 10,634,327 | B2 | 4/2020 | Cornell et al. |
| 10,683,998 | B2 * | 6/2020 | Gall ............... F16M 11/10 |
| D921,964 | S | 6/2021 | Kawase et al. |
| 11,112,099 | B2 | 9/2021 | Miwa |
| 11,512,820 | B2 | 11/2022 | Adams et al. |
| D985,164 | S | 5/2023 | Mei |
| D988,556 | S | 6/2023 | Wang |
| 2005/0036308 | A1 | 2/2005 | Wright |
| 2007/0252067 | A1 | 11/2007 | Lee |
| 2010/0142213 | A1 | 6/2010 | Bigge et al. |
| 2011/0122605 | A1 | 5/2011 | Deighton et al. |
| 2014/0301066 | A1 | 10/2014 | Inskeep |
| 2016/0091196 | A1 | 3/2016 | Chien |
| 2016/0298831 | A1 * | 10/2016 | Fang ............... F21V 17/007 |
| 2016/0312967 | A1 | 10/2016 | Harvey et al. |
| 2017/0350577 | A1 | 12/2017 | Harvey et al. |
| 2018/0058673 | A1 | 3/2018 | Fang |
| 2018/0149344 | A1 | 5/2018 | Cornell et al. |
| 2018/0340661 | A1 | 11/2018 | Inskeep |
| 2019/0107270 | A1 | 4/2019 | Harvey et al. |
| 2021/0140614 | A1 | 5/2021 | Miwa |
| 2022/0221115 | A1 | 7/2022 | Hopkins et al. |
| 2022/0316687 | A1 * | 10/2022 | Tao ............... F21V 21/06 |
| 2022/0404002 | A1 | 12/2022 | Proeber et al. |
| 2023/0296233 | A1 | 9/2023 | Bai et al. |

FOREIGN PATENT DOCUMENTS

| | | |
|---|---|---|
| DE | 9316598 U1 | 1/1994 |
| DE | 29520042 U1 | 2/1996 |
| DE | 202004001261 U1 | 4/2004 |
| GB | 2166649 A | 5/1986 |
| KR | 1020150129210 A | 11/2015 |

OTHER PUBLICATIONS

Partial Supplementary European Search Report for Application No. 20844391.1 dated Jun. 15, 2023 (13 pages).

LUTEC, "[Upgraded] LUTEC 6290Max 11000 Lumen 92W Dimmable LED Work Light with Telescoping Tripod, Adjustable Color Temperature Dual-Head Work Light with Stand and 8 Ft 3-Prong Power Cord," <https://www.amazon.com/%E3%80%90Upgraded%E3%80%91LUTEC-Telescoping-Adjustable-Temperature-Dual-Head/dp/B089SRBXQH> web page visited Sep. 21, 2023 (14 pages).

Stanley, "Stanley Led Work Light with Stand 7000-Lumen Portable Corded LED Portable Job Site Lighting 4000K 80W Indoor Outdoor Lighting," <https://www.amazon.com/Stanley-7000-Lumen-Portable-Lighting_outdoor/dp/B07VLKXJBT> web page visited Sep. 21, 2023 (13 pages).

Extended European Search Report for Application No. 20844391.1 dated Sep. 15, 2023 (11 pages).

* cited by examiner

STAND LIGHT

CROSS-REFERENCE TO RELATED APPLICATIONS

This application is a national phase filing under 35 U.S.C. 371 of International Application No. PCT/US2020/042800 filed Jul. 20, 2020, which claims priority to U.S. Provisional Patent Application No. 62/876,321, filed on Jul. 19, 2019, the entire contents of which are incorporated by reference herein.

FIELD OF THE INVENTION

The present invention relates to work lights and, more particularly, to work lights including foldable stands.

BACKGROUND

Area work lights are typically used to provide light to remote work areas or job sites that do not have sufficient ambient lighting. Some work lights are compact or configurable into compact configurations, allowing the work lights to be repositioned and easily transported to and from job sites.

SUMMARY

In one aspect, the invention provides a stand light including an elongate body defining a longitudinal axis, a collar coupled to the elongate body for movement along the elongate body between a first position and a second position, and a plurality of legs coupled to the collar. The plurality of legs is collapsed against the elongate body when the collar is in the first position and is expanded apart from the elongate body when the collar is in the second position. The stand light also includes a head assembly coupled to an end of the elongate body. The head assembly includes a hub and a plurality of light heads. The hub is pivotably coupled to the end of the elongate body to pivot about a first pivot axis. Each of the plurality of light heads is pivotably coupled to the hub to pivot about a second pivot axis.

In another aspect, the invention provides a stand light including an elongate body defining a longitudinal axis, a light head coupled to an end of the elongate body, a collar coupled to the elongate body for movement along the elongate body between a first position and a second position, a rail spaced apart from the elongate body and extending along an axis substantially parallel to the longitudinal axis, a handle coupled to the rail. The handle also coupled to the collar for movement with the collar along the rail between the first position and the second position. The stand light also includes a plurality of legs coupled to the collar, the plurality of legs being collapsed against the elongate body when the handle and the collar are in the first position and being expanded apart from the elongate body when the handle and the collar are in the second position.

In yet another aspect, the invention provides a stand light including an elongate body including a plurality of extension poles and defining a longitudinal axis, a head assembly coupled to one of the plurality of extension poles and including a light head, and a head assembly housing coupled to the elongate housing. The head assembly housing is configured to receive the head assembly when the plurality of extension poles is retracted. The stand light also includes a handle extending from the head assembly housing, a collar coupled to the elongate housing for movement along the elongate body between a first position and a second position, and a plurality of legs coupled to the collar. The plurality of legs is collapsed against the elongate body when the collar is in the first position and is expanded apart from the elongate body when the collar is in the second position. The stand light further includes a user interface supported by the handle and including a port configured to charge an external device.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 5A:
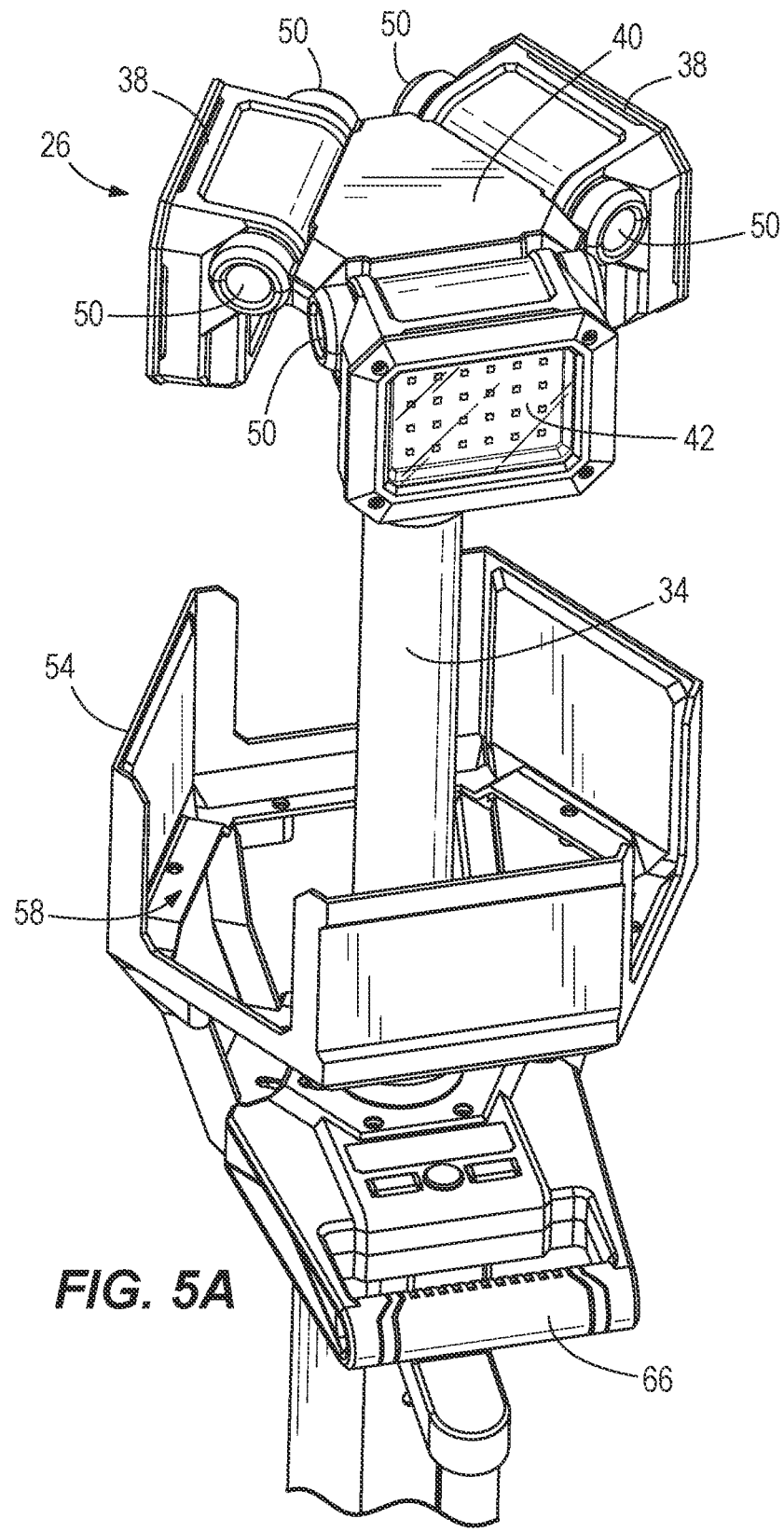
FIG. 5A is an enlarged perspective view of a head assembly of the stand light of FIG. 1.
Figure 5B:
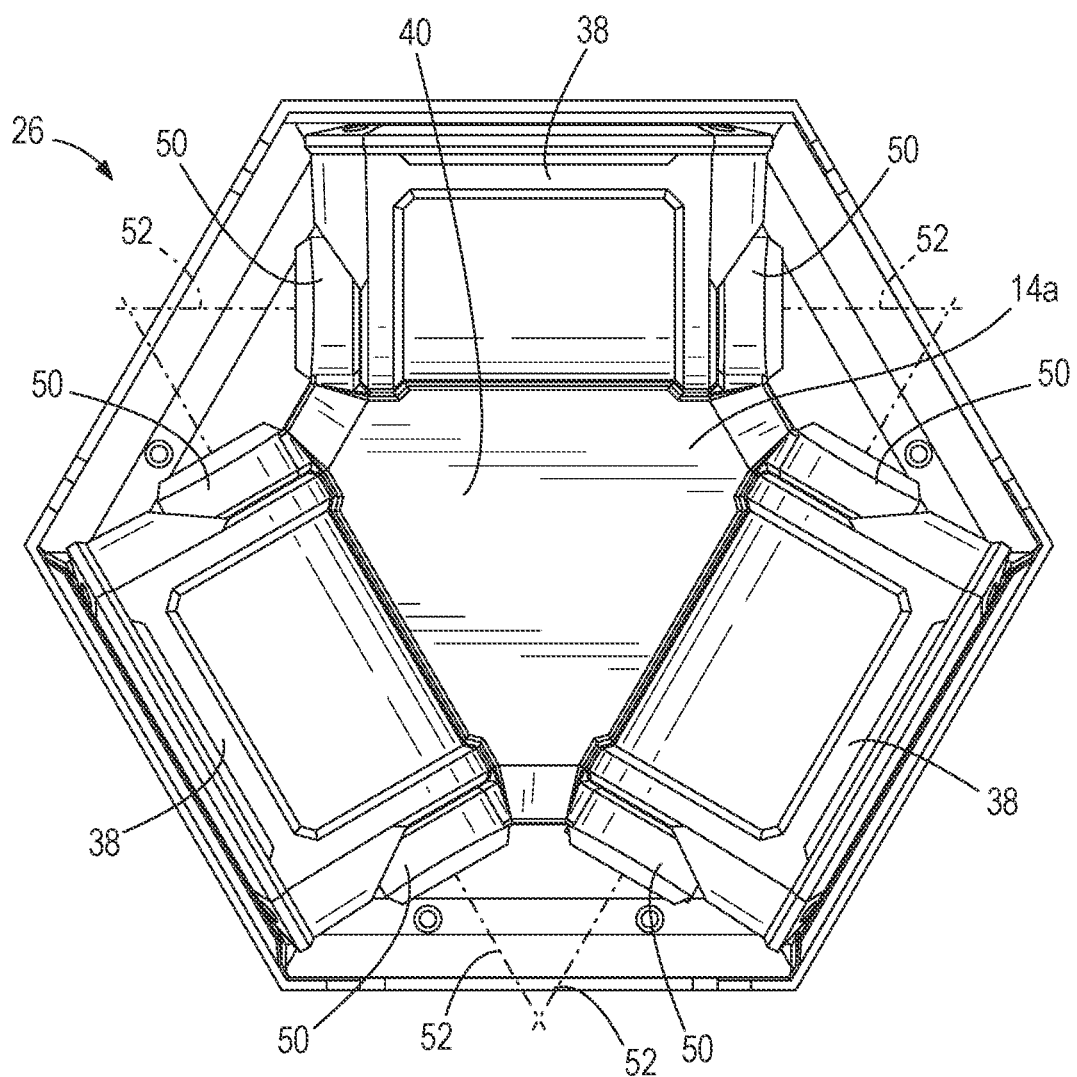
FIG. 5B is a top view of the head assembly of FIG. 5A.
Figure 6:
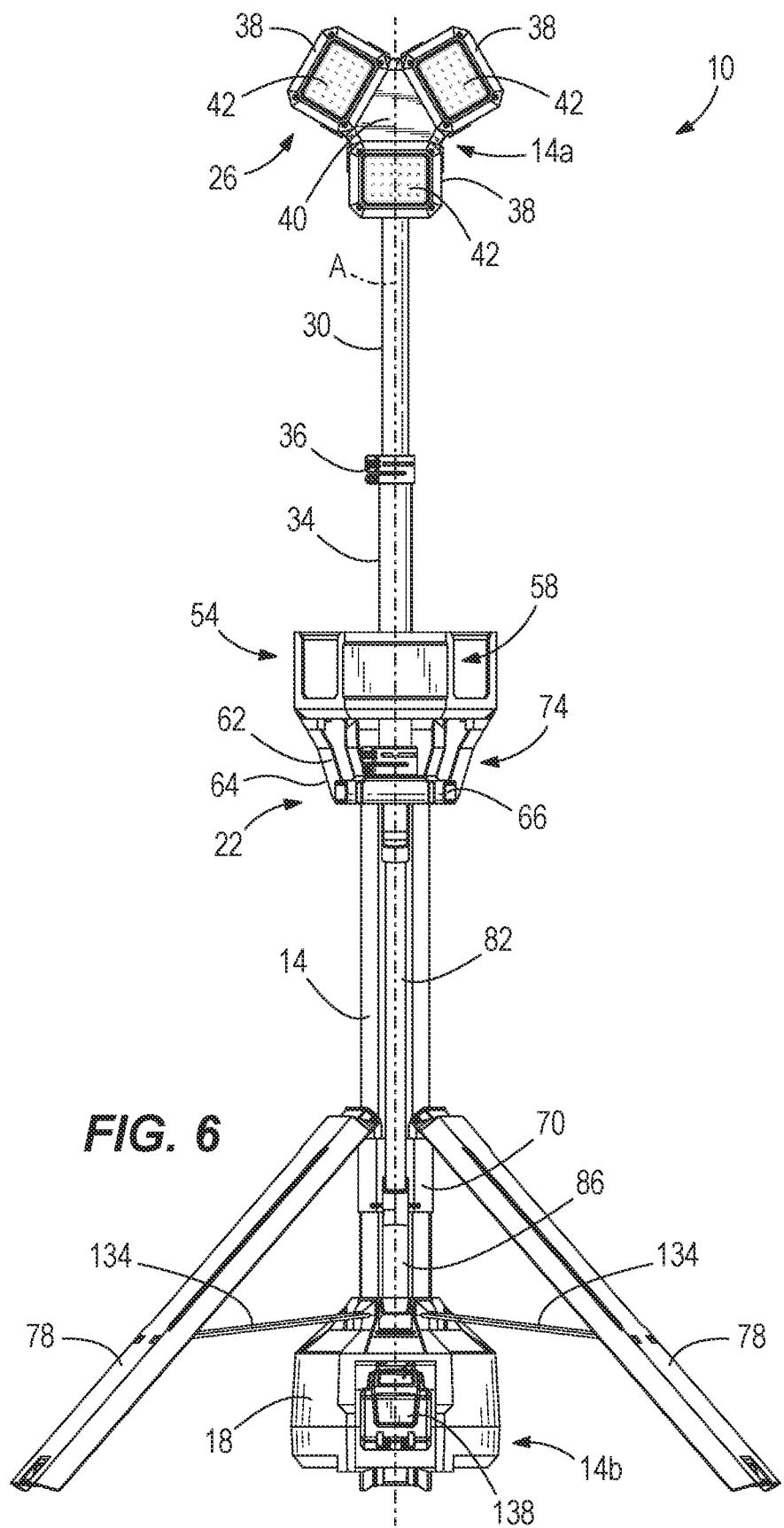
FIG. 6 is a perspective view of the stand light of FIG. 1 in an expanded position.

FIGS. 1-7 illustrate a stand light 10 including an elongate body 14, a base housing 18, a support assembly 22, and a head assembly 26. The stand light 10 is configurable in either a collapsed position, as shown in FIGS. 1-4, or an expanded position, as shown in FIG. 6. In the collapsed position, the stand light 10 is relatively compact for storing and transporting. In the operating position, the stand light 10 may be self-supported on a surface. The collapsed position may also be referred to as a storage position or a transport position. The expanded position may also be referred to as an operating position With continued reference to FIGS. 1-4, the elongate body 14 includes a first, top end 14a and a second, bottom end 14b opposite the top end 14a. The elongate body 14 further includes a longitudinal axis A (FIGS. 1 and 6) that extends through the first end 14a and the second end 14b.

With reference to FIG. 6, the elongate body 14 is a telescoping body that includes a plurality of elongate telescoping members, or extension poles, 30, 34 to allow the body to be extendable in length. The illustrated body 14 includes a first extension pole 30 and a second extension pole 34. In alternate embodiments, any number of extension poles may be used. The extension poles 30, 34 each include a longitudinal axis that is coaxial with the longitudinal axis A of the elongate body 14. Additionally, the extension poles 30, 34 are selectively secured in either an expanded position (FIG. 6), a retracted position (FIGS. 1-4), or any position in between by a clamping assembly 36. The clamping assembly 36 is movable between a clamping position and an unclamped position. When in the clamping position, the clamping assembly 36 secures the extension poles 30, 34 in position. When in the unclamped position, the clamping assembly 36 allows the extension poles 30, 34 to move (e.g., slide) relative to each other.

With reference to FIG. 6, the illustrated head assembly 26 includes a plurality of light heads 38 coupled to a hub 40. Each light head 38 includes a light source 42. In the illustrated embodiment, the head assembly 26 includes three light heads 38. In other embodiments, the head assembly 26 may include a single light head or may include two or more light heads. Each light source 42 may include one or more light emitting diodes (LEDs) arranged in an array to provide uniform illumination of an area. In alternate embodiments, various light sources may be used in place of the LEDs. The light heads 38 are movable (e.g., pivotable) relative to the hub 40. In the illustrated embodiment, each of the light heads 38 is pivotable relative to the hub 40 independently of the other light heads 38. As such, the light heads 38 can be oriented to direct light in different directions.

The head assembly 26 is coupled to a distal end of the first extension pole 30, therefore allowing a height of the head assembly 26 to be adjustable via the extension poles 30, 34 between the expanded position and the retracted position. In addition, the head assembly 26 is rotatably coupled to the upper end of the first extension pole 30 such that the head assembly 26 is rotatable about the longitudinal axis A of the body 14. In the retracted position, the head assembly 26 is adjacent the first end 14a of the body 14. The head assembly 26 also includes a hinge 28 to allow the head assembly 26 to be pivoted about a pivot axis 32 of the hinge 28 by more than about 180 degrees without the head assembly 26 contacting the light body 14. The pivot axis 32 is perpendicular to the longitudinal axis A. The pivot axis 32 also intersects the longitudinal axis A. In a normal operating position, the pivot axis 32 is also a horizontal axis. The hinge provides 28 the head assembly 26 with a pitch of more than about 90 degrees in both directions from the upright position.

With reference to FIGS. 5A and 5B, each of the independent light heads 38 is pivotably coupled between a pair of hinge lobes 50 of the hub 40 about a pivot axis 52. The hinge lobes 50 extend horizontally outward from the hub 40. Each of the horizontal axes 52 is offset from the longitudinal axis A of the elongate body 14 and allows each of the independent light heads 38 to be independently pivoted about the corresponding horizontal axis by more than about 180 degrees without the independent light head 38 contacting the light body 14. Each of the independent light heads 38 is pivotable between a generally upward facing direction and a generally downward facing direction. The head assembly 26 may include an alternative mechanism to releasably secure each of the light heads 38 independently in various, discrete positions about the corresponding horizontal axis 52. The independent light heads 38 are equally spaced circumferentially about the longitudinal axis A of the elongate body 14 by about 120 degrees.

With reference to FIGS. 1-5A, the stand light 10 further includes a head assembly housing 54 fixed to the first end 14a of the body 14. The head assembly housing 54 includes an opening 58 to receive the head assembly 26 when the extension poles 30, 34 are in the retracted position. The head assembly housing 54 defines cutaways 62 in sidewalls 64 of the housing 54 to provide access to the head assembly 26 so that the head assembly 26 may be pulled out of the head assembly housing 54 and the extension poles 30, 34 extended to the desired height. The cutaways 62 also facilitate cooling the head assembly 26 after use. The sidewalls 64 also help protect the light heads 38 when the head assembly 26 is received in the opening 58. For example, the light heads 38 (and, particularly, the light sources 42) are oriented to face radially outward when the head assembly 26 is received in the head assembly housing 54. The sidewalls 64 provide solid surfaces that are shaped and sized to cover the light sources 42 in this position.

The head assembly housing 54 further includes a fixed or stationary handle 66 to facilitate carrying the stand 10 when in the collapsed position. The fixed handle 66 is secured to the head assembly housing 54 and located beneath the housing 54. The illustrated fixed handle 66 has a grip defining a grip axis that is generally perpendicular to and offset from the longitudinal axis A of the elongate body 14.

With reference to FIG. 6, the support assembly 22 includes a collar 70, a handle assembly 74, and a plurality of legs 78. The collar 70 is coupled around a portion of the elongate body 14. The collar 70 is movable (e.g., slidable) along the elongate body 14 in directions parallel to the longitudinal axis A.

The handle assembly 74 includes a stationary carry handle 82 and a leg deploy handle 86. The illustrated stationary carry handle 82 is a rail that extends along the stand light 10 substantially parallel to the longitudinal axis A. The stationary carry handle 82 has a grip axis 84 that is generally parallel to and offset from the longitudinal axis A of the elongate body 14. The grip axis 84 is also perpendicular to the grip axis of the fixed handle 66. A user may grasp the stationary carry handle 82 when transporting or positioning the stand light 10. The leg deploy handle 86 is coupled to the collar 70 and moveable with the collar 70 along the stationary carry handle 82. In the collapsed position, the leg deploy handle 86 is adjacent the first end 14a of the body 14, and while in the collapsed position, the leg deploy handle 86 facilitates carrying of the stand light 10. In the expanded position, the leg deploy handle 86 is adjacent the second end 14b of the body 14. Movement of the leg deploy handle 86 relative to the body 14 will be described in greater detail below.

Figure 7:
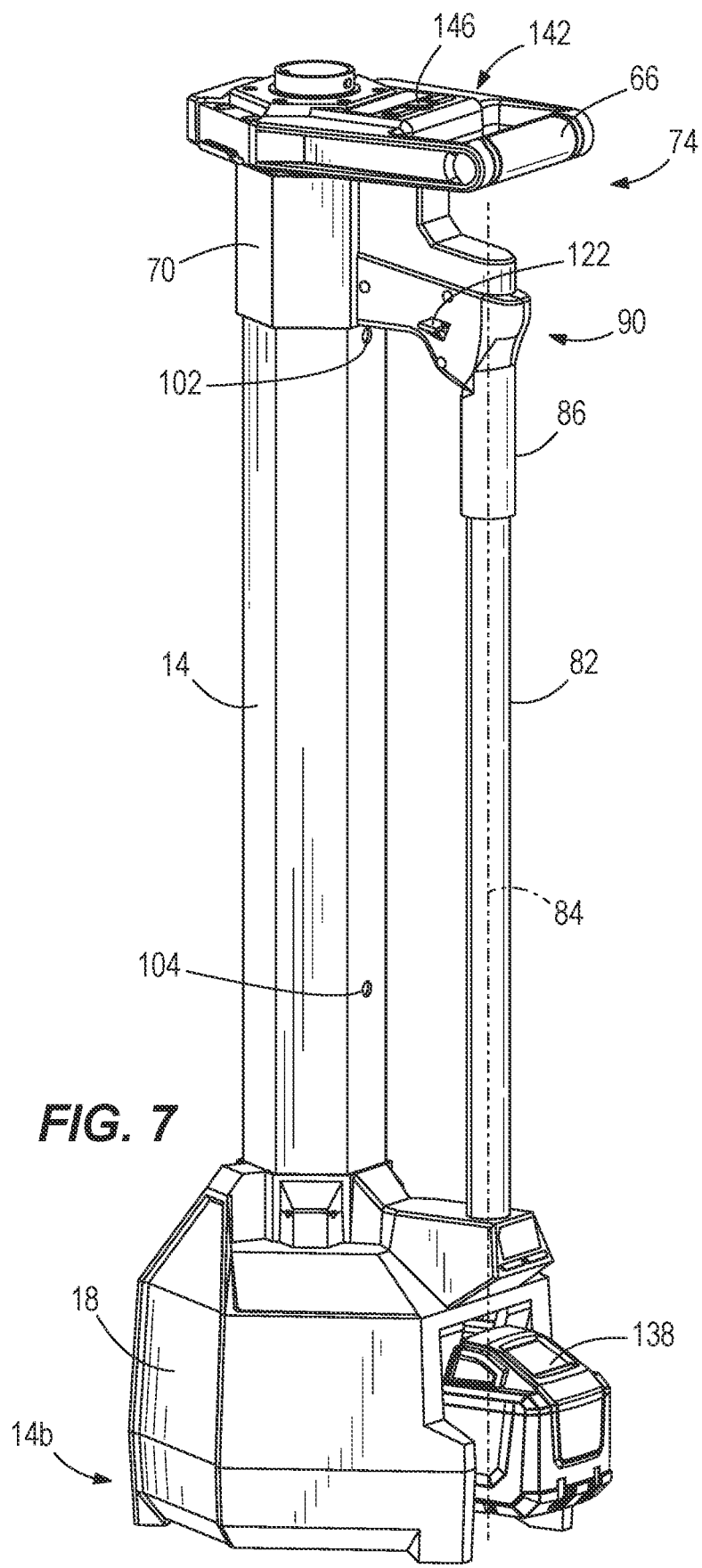
FIG. 7 is a perspective view of the stand light of FIG. 1, with the head assembly and legs removed.
Figure 8:
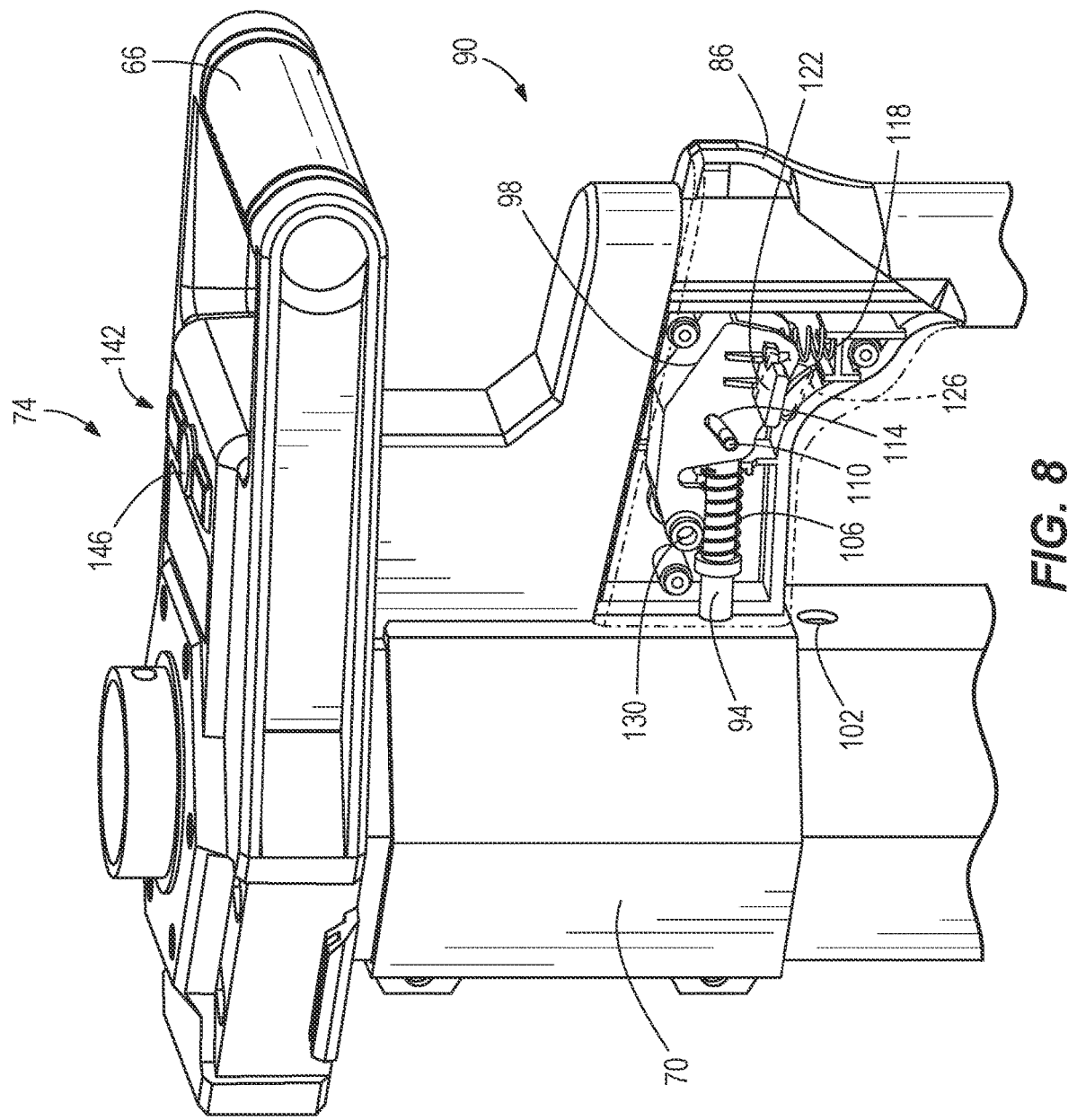
FIG. 8 is an enlarged cutaway view of a locking assembly of the stand light of FIG. 1, illustrating the locking assembly in a locked position.

With reference to FIGS. 7-8, the handle assembly 74 further includes a locking assembly 90. The illustrated locking assembly 90 has a pin or rod 94 and a moveable member 98. In the illustrated embodiment, the locking assembly 90 is supported by the leg deploy handle 86. A first biasing member 106 is coupled to the rod 94. In the illustrated embodiment, the first biasing member 106 is a coil spring that is positioned around a portion of the rod 94. In other embodiments, the biasing member 106 may be another type of suitable spring. A locking pin 110 protrudes from a first end of the rod 94. A second end of the rod 94 is configured to engage first and second apertures 102, 104 (FIG. 7) formed in the body 14, thereby securing the leg deploy handle 86 to the body 14 in a locked position. The locking pin 110 is positioned within a slot 114 of the moveable member 98. A second biasing member 118 is coupled to the moveable member to bias the moveable member toward the locked position. In the illustrated embodiment, the second biasing member 118 is a spring positioned adjacent an underside of the moveable member. In other embodiments, the biasing member 118 may be another type of suitable spring.

Figure 2:
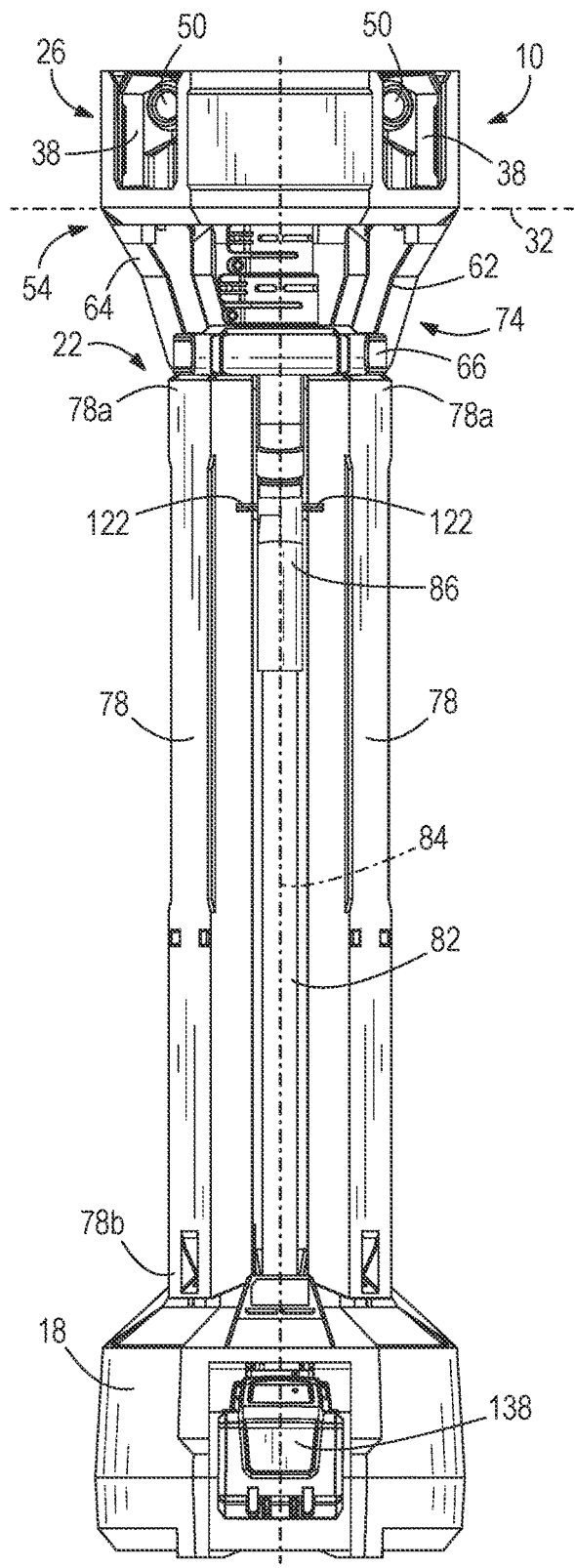
FIG. 2 is a front view of the stand light of FIG. 1 in the collapsed position.
Figure 3:
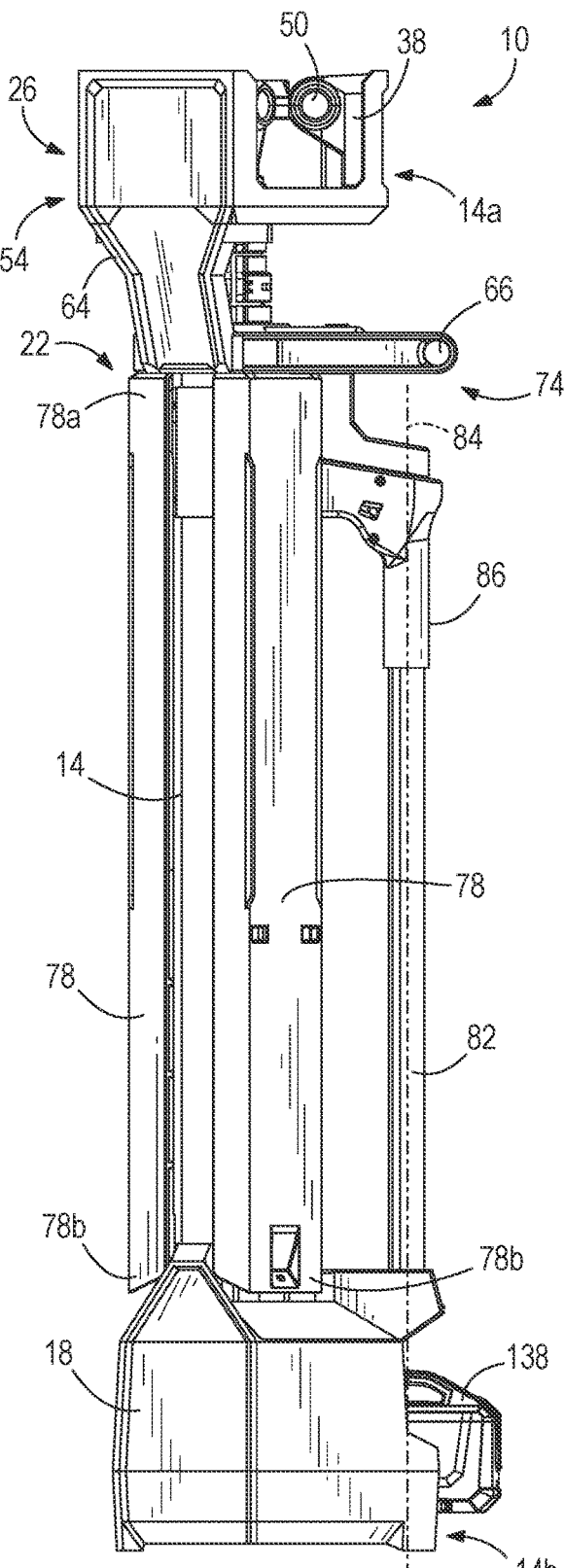
FIG. 3 is a first side view of the stand light of FIG. 1 in the collapsed position.

The illustrated movable member 98 also includes a flange or actuator 122. The actuator 122 protrudes outwardly from the movable member 98 and through a locking recess 126 of the leg deploy handle 86. In the illustrated embodiment, the movable member 98 includes two actuators 122, one protruding from each side of the movable member 98 (as shown in FIG. 2). Such an arrangement allows the actuators 122 to be engaged by different thumbs of a user, depending on whether the leg deploy handle 86 is grasped by a left hand or a right hand of the user. In other embodiments, the moveable member 98 may only include one actuator 122.

With reference to FIG. 8, the locking assembly 90 is arranged such that the rod 94 is biased toward the locked position. Specifically, the first and second biasing members 106, 118 bias the rod 94 toward the body 14. When the leg deploy handle 86 is in the collapsed position, the second end of the rod 94 is biased into the first aperture 102. When the leg deploy handle 86 is in the expanded position, the second end of the rod 94 is biased into the second aperture 104 (FIG. 7). In the locked position, the actuators 122 abut first, upper ends of the locking recesses 126. In the locked position, the leg deploy handle 86 is secured (i.e., unmovable) relative to the stationary carry handle 82.

To move the rod 94 away from the body 14 toward an unlocked position, either one of the actuators 122 is actuated (e.g., depressed). Actuating the actuator 122 causes the moveable member 98 to pivot about a pivot point 130 toward the body 14. As the moveable member 98 moves toward body 14, the first and second biasing members 106, 118 are compressed. Concurrently, the locking pin 110 follows the slot 114 in the moveable member 98 to urge the rod 94 away from the body 14 and out of the apertures 102, 104. In the unlocked position, the actuators 122 abut second, lower ends of the locking recesses 126. In this position, the leg deploy handle 86 is slidable along the stationary carry handle 82.

Referring back to FIG. 6, in the illustrated embodiment, the support assembly 22 includes three legs 78, each having a longitudinal axis. In alternative embodiments, the support assembly 22 may include any number of legs. Each of the legs 78 has a first end 78a and a second end 78b. The legs 78 are circumferentially spaced equidistant around the elongate body 14 by about 120 degrees. Each of the legs 78 is hingedly coupled at the first end 78a of the legs 78 to the collar 70 to allow the second end 78b of the legs 78 to be pivoted away from the body 14. In addition, each of the legs 78 is also pivotally coupled to the second end 14b of the body 14 by a leg link 134, which limits the outward pivotal movement of the legs 78. The legs 78 are connected to the collar 70 and the leg links 134 such that, when the collar 70 is adjacent the first end 14a of the body 14, the stand light 10 is in the collapsed position. In the collapsed position, the axis of each of the legs 78 is generally parallel with the axis A of the body 14. When the collar 70 is adjacent the second end 14b of the body 14, the stand light 10 is in the expanded, operating position. In the expanded position, the legs 78 are pivoted away from the body 14 such that each of the axes of the legs 78 forms an acute angle with the axis A of the body 14. The second end 78b of the legs 78 are spaced apart to support the stand light 10 on a surface.

Figure 1:
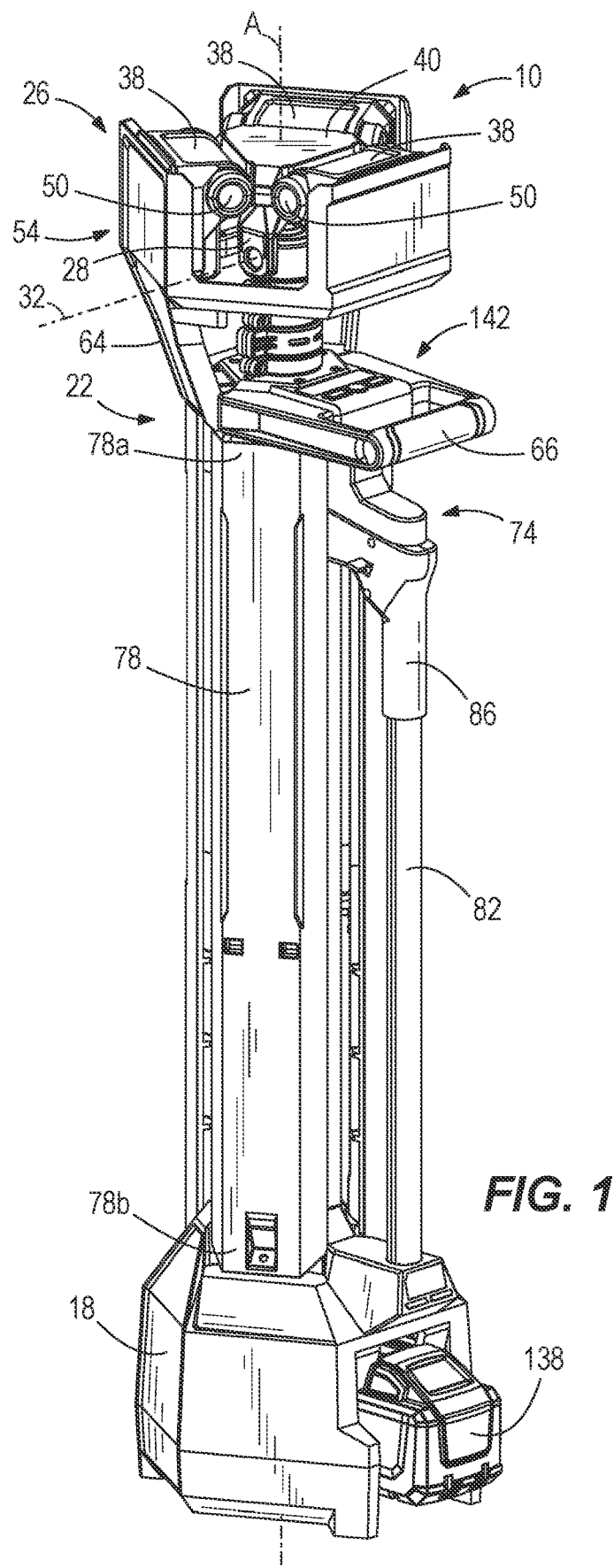
FIG. 1 is a front perspective view of stand light in a collapsed position.

With reference to FIGS. 1-2, the base housing 18 is positioned at the second end 14b of the body 14. The illustrated base housing 18 includes a battery pack interface defining a recess that receives a battery pack 138 to power the light 10. The base housing 22 further includes a power module that is electrically connected to the light heads 38. The battery pack 138 provides direct current (DC) power to the light stand 10. The battery pack 138 may be electrically connected to the power module.

The base housing 18 also includes a power inlet 80. The power inlet 80 connects the light 10 to an AC power source, such as a wall outlet or generator, to power the light 10. In some embodiments, the base housing 18 may also include a power outlet. The power outlet may connect the light to another device (e.g., a power tool) to power that device. In some configurations, the power outlet may connect another light stand 10 (or other light) so that a series of lights can be daisy-chained together. If both the battery pack 138 and an AC power source are connected to the light 10, the AC power source will charge the battery pack 138 and power the light 10. If the AC power source is disconnected from the light 10, the battery pack 138 will automatically being powering the light 10.

The battery pack 138 may be a power tool battery pack generally used to power a power tool, such as an electric drill, an electric saw, and the like (e.g., an 18 volt rechargeable battery pack, or an M18 REDLITHIUM battery pack sold by Milwaukee Electric Tool Corporation). The battery pack 138 may include lithium ion (Li-ion) cells. In alternate embodiments, the battery packs may be of a different chemistry (e.g., nickel-cadmium (NiCa or NiCad), nickel-hydride, and the like). In the illustrated embodiments, the battery pack 138 is an 18 volt battery pack. In alternate embodiments, the capacity of the battery pack 138 may vary (e.g., the battery pack may be a 4 volt battery pack, a 28 volt battery pack, a 40 volt battery pack, or battery pack of any other voltage).

Figure 4:
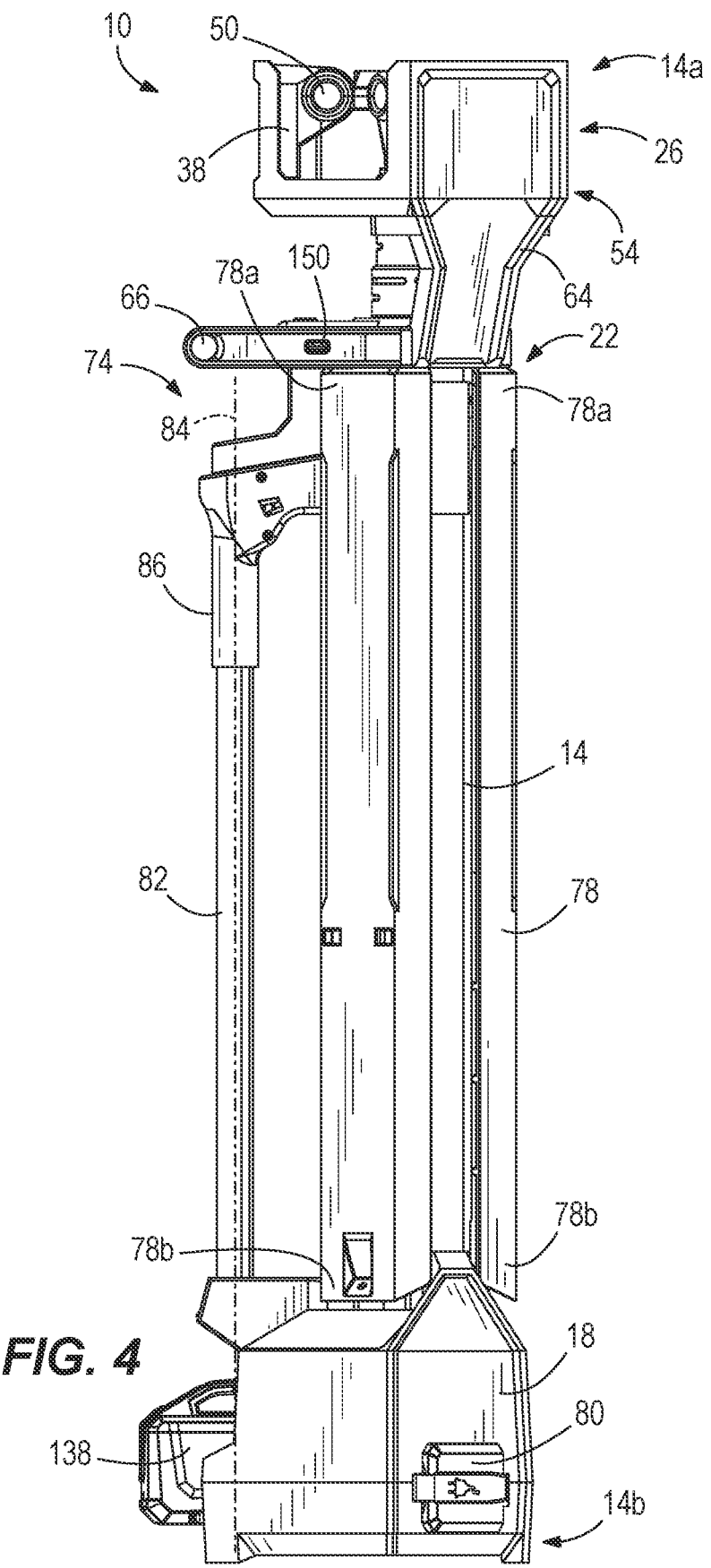
FIG. 4 is a second side view of the stand light of FIG. 1 in the collapsed position.

As discussed above, the head assembly 26 includes a plurality of LEDs arranged in an array that provide a generally uniform illumination of a desired area. The fixed handle 66 further includes a user interface 142 that may include functions or controls to control operation and functions on the stand light 10. As illustrated in FIG. 7, the user interface 142 includes a power actuator 146 operable to toggle power to the stand light 10. To control power to the stand light 10 and the head assembly 26, a user actuates the power actuator 146 on the user interface 142, pressing the power actuator 146 to turn power on/off. The fixed handle 66 additionally includes a charging port 150 (FIG. 4). In the illustrated embodiments, the charging port 150 is a USB port, although other suitable charging ports may also or alternatively be included on the light 10. The charging port 150 allows a user to connect and charge a device, such as a smartphone, using the battery pack 138.

Referring back to FIGS. 1-5, during use to deploy the light stand 10 into the operating position (from the collapsed position), a user grasps the fixed handle 66 with a first hand and the leg deploy handle 86 with a second hand. The user then depresses the actuator 122 downwardly with his/her thumb of the second hand to unlock the leg deploy handle 86 via the locking assembly 90. Once disengaged, the user slides the leg deploy handle 86 along the stationary carry handle 82, or rail, toward the second end 14b of the body 14 (i.e., downwardly), causing the legs 78 to pivot outwardly into the operating position as shown in FIG. 6. More specifically, the user depresses the actuator 122, causing the moveable member 98 to pivot about the pivot point 130 and the locking pin 110 to slide along the slot 114, disengaging the rod 94 from the first aperture 102. The user then slides the leg deploy handle 86 and the collar 70 downwardly toward the second end 14b of the body 14. As the first ends 78a of the legs 78 approach the second end 14b of the body 14, the second ends 78b of the legs 78 are pivoted outwardly about the hinged end by the leg links 134. The leg deploy handle 86 is secured in the operating position when the rod 94 is aligned with and slides into the second aperture 104. The leg deploy handle 86 is then inhibited from moving relative to the stationary carry handle 82. In the operating position, the stand light 10 may be supported on ground or an operating surface such that the axis A of the body 14 is generally vertical (i.e., perpendicular to the ground or the operating surface).

To return the stand light 10 to the collapsed or storage position to transport or store the stand light 10, a user grasps the fixed handle 66 with his/her first hand and the leg deploy handle 86 with his/her second hand. The user then depresses the actuator 122 downwardly with his/her thumb of the second hand to unlock the leg deploy handle 86 via the locking assembly 90. Movement of the actuator 122 causes the moveable member 98 to pivot about the pivot point 130 and the locking pin 110 to slide along the slot 114, thereby disengaging the rod 94 from the second aperture 104. The user then slides the leg deploy handle 86 along the stationary handle 82 towards the first end of the elongate body 14 to cause the legs 78 to pivot inwardly into the collapsed position, as shown in FIGS. 1-4. As the collar 70 moves upward, the legs 78 pivot inward about the first ends 78a of the legs 78 and the leg links 134 fold inwardly. Once the leg deploy handle 86 and the collar 70 are adjacent the first end 14a of the body 14 and cannot slide further, the rod 94 is aligned with and slides into the first aperture 102. The leg deploy handle 86 is then inhibited from moving relative to the stationary carry handle 82. The user may then grasp the stationary carry handle 82 to transport the light 10.

When in the operating position, the head assembly 26 may be extended from the head assembly housing 54 by moving the clamping assembly 36 to the unclamped position, thus allowing for adjustment in height of the head assembly 26 via the extension poles 30, 34. Once the clamping assembly 36 is in the unclamped position, the user may lift the head assembly 26 out of the opening 58 in the head assembly housing 54 to adjust the height of the head assembly 26. While the clamping assembly 36 is unclamped to shorten the height of the head assembly 26, the user pushes down on the head assembly 26 to collapse extension poles 30, 34. In this way, the body 14 may be extended or retracted between a first position and a second position. The head assembly 26 may be adjusted to any height within the range of the adjustable height via the extension poles 30, 34. When in the unclamped position, manual force is used to move the extension poles 30, 34 between the retracted position (FIGS. 1-4) and the expanded position (FIG. 6). The clamping assembly 36 is then moved to the clamped position, where the clamping assembly 36 selectively tensions the extension poles 30, 34 of the telescoping body 14 to inhibit the extension poles 30, 34 to slide relative to one another.

Although the invention has been described in detail with reference to certain preferred embodiments, variations and modifications exist within the scope and spirit of one or more independent aspects of the invention as described. Various features and advantages of the invention are set forth in the following claims.

The invention claimed is:

1. A stand light comprising:
an elongate body defining a longitudinal axis;
a collar coupled to the elongate body for movement along the elongate body between a first position and a second position;
a plurality of legs coupled to the collar, the plurality of legs being collapsed against the elongate body when the collar is in the first position and being expanded apart from the elongate body when the collar is in the second position;
a head assembly coupled to an end of the elongate body, the head assembly including a hub and a plurality of light heads, the hub pivotably coupled to the end of the elongate body to pivot about a first pivot axis, each of the plurality of light heads pivotably coupled to the hub to pivot about a second pivot axis; and
a head assembly housing coupled to the elongate body, wherein the elongate body includes a plurality of extension poles that allow the elongate body to be extendable in length, and wherein the head assembly housing receives the head assembly when the plurality of extension poles is retracted,
each of the plurality of light heads faces radially outward and is covered by a sidewall of the head assembly housing when the head assembly is received in the head assembly housing.

2. The stand light of claim 1, wherein the first pivot axis is perpendicular to the longitudinal axis.

3. The stand light of claim 2, wherein the first pivot axis intersects the longitudinal axis.

4. The stand light of claim 1, wherein each second pivot axis is angled relative to and spaced apart from the first pivot axis.

5. The stand light of claim 1, wherein each of the plurality of light heads is pivotably coupled to the hub by a pair of hinge lobes.

6. The stand light of claim 1, wherein each of the plurality of light heads is configured to independently pivot relative to each other.

7. The stand light of claim 1, wherein the hub is rotatable about the longitudinal axis relative to the elongate body.

8. The stand light of claim 1, wherein the plurality of light heads includes a first light head, a second light head, and a third light head.

9. The stand light of claim 1, wherein each of the plurality of light heads are circumferentially spaced about the longitudinal axis.

10. A stand light comprising:
an elongate body defining a longitudinal axis;
a light head coupled to an end of the elongate body;
a collar coupled to the elongate body for movement along the elongate body between a first position and a second position;
a rail spaced apart from the elongate body and extending along an axis substantially parallel to the longitudinal axis;
a handle coupled to the rail, the handle also coupled to the collar for movement with the collar along the rail between the first position and the second position; and
a plurality of legs coupled to the collar, the plurality of legs being collapsed against the elongate body when the handle and the collar are in the first position and being expanded apart from the elongate body when the handle and the collar are in the second position.

11. The stand light of claim 10, further comprising a locking assembly supported by the handle, wherein the locking assembly includes a pin and a moveable member, wherein the locking assembly is movable between a locked position where the pin engages the elongate body, and an unlocked position where the pin disengages the elongate body.

12. The stand light of claim 11, wherein the elongate body includes a first aperture and a second aperture, wherein when the plurality of legs is collapsed against the elongate body, the pin is received in the first aperture, and when the plurality of legs is expanded apart from the elongate body, the pin is received in the second aperture.

13. The stand light of claim 11, wherein the locking assembly includes an actuator extending outwardly from the handle, and wherein the actuator is engageable by a user to move the moveable member.

14. The stand light of claim 13, wherein the actuator extends outwardly from opposing sides of the handle.

15. The stand light of claim 10, wherein the handle is a first handle, and further comprising a second handle that is fixed to the elongate housing, the second handle defining a grip axis that is perpendicular to and offset from the longitudinal axis.

16. A stand light comprising:
   an elongate body including a plurality of extension poles and defining a longitudinal axis;
   a head assembly coupled to one of the plurality of extension poles and including a light head;
   a handle for carrying the stand light;
   a collar coupled to the elongate body for movement along the elongate body between a first position and a second position;
   a plurality of legs coupled to the collar, the plurality of legs being collapsed against the elongate body when the collar is in the first position and being expanded apart from the elongate body when the collar is in the second position; and
   a user interface supported by the handle and including a port configured to charge an external device,
   wherein the port is a USB port having an insertion axis that is angularly skewed relative to the longitudinal axis.

17. The stand light of claim 16, wherein the user interface also includes an actuator operable to control operation of the light head.

18. The stand light of claim 16, further comprising a battery pack supported by the elongate housing, the battery pack operable to power the light head and charge the external device connected to the port.

19. The stand light of claim 18, wherein the battery pack is supported on a second end of the elongate housing opposite from the head assembly.

\* \* \* \* \*